United States Patent
Altice et al.

(10) Patent No.: US 8,708,746 B2
(45) Date of Patent: Apr. 29, 2014

(54) MULTIFUNCTION NETWORKABLE CONTROLLER PLUG AND METHODS OF OPERATION THEREOF

(76) Inventors: Walter Jason Altice, Newport News, VA (US); Matthew Brandon Smith, Virginia Beach, VA (US)

(*) Notice: Subject to any disclaimer, the term of this patent is extended or adjusted under 35 U.S.C. 154(b) by 157 days.

(21) Appl. No.: 13/346,728

(22) Filed: Jan. 10, 2012

(65) Prior Publication Data

US 2013/0178093 A1 Jul. 11, 2013

(51) Int. Cl.
*F16K 31/02* (2006.01)

(52) U.S. Cl.
USPC .............. 439/620.21; 439/577; 251/129.04; 137/551

(58) Field of Classification Search
USPC ........... 439/620.21, 620.22, 577; 251/120.04, 251/129.04; 137/551
See application file for complete search history.

(56) References Cited

U.S. PATENT DOCUMENTS

| | | | | |
|---|---|---|---|---|
| 4,826,141 A | * | 5/1989 | Buma et al. | 267/64.28 |
| 5,094,570 A | * | 3/1992 | LaCombe et al. | 408/130 |
| 5,369,962 A | * | 12/1994 | Szynal et al. | 62/298 |
| 5,522,431 A | * | 6/1996 | Bonacorsi et al. | 137/884 |
| 5,541,810 A | * | 7/1996 | Donhauser et al. | 361/679.41 |
| 6,257,264 B1 | * | 7/2001 | Sturman et al. | 137/1 |
| 7,064,679 B2 | * | 6/2006 | Ehrke et al. | 340/870.02 |
| 7,173,428 B2 | * | 2/2007 | Hurwicz | 324/424 |
| 7,635,284 B1 | * | 12/2009 | Nemir et al. | 439/646 |
| 7,866,172 B2 | * | 1/2011 | Douglas et al. | 62/149 |
| 2003/0090042 A1 | * | 5/2003 | Sevigny et al. | 264/554 |
| 2007/0173960 A1 | * | 7/2007 | Kumar | 700/40 |

* cited by examiner

Primary Examiner — Gary Paumen

(57) ABSTRACT

A compact electrical plug characterized as a receptacle with a self-contained programmable, networkable controller which can be installed directly onto an electromechanical valve or relay. The plug has a controller built into the receptacle housing. It can be configured to run autonomously based on an internal closed loop feedback algorithm or manually controlled based on commands received remotely by a computer or custom control interface. The invention can be networked with other plugs like it providing a streamlined network where multiple electromechanical valves and\or relays can be controlled at one time. The plug has multiple visual indications providing the operating status and error states of the connected component and contained controller.

3 Claims, 6 Drawing Sheets

MULTIFUNCTION NETWORKABLE CONTROLLER PLUG AND METHODS OF OPERATION THEREOF

CROSS-REFERENCE TO RELATED APPLICATIONS

Provisional Patent Application No. 61/431,340 Jan. 10, 2011

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field

This invention relates to a multifunction networkable control plug commonly used in hydraulic or pneumatic operated system with one or more valves. More specifically, it relates to a plug with a self-contained electronic programmable controller and visual indicators. The present invention substantially improves the ability to modularize and diagnose a hydraulic or pneumatic control system.

2. Background

Electronic controllers for valves are known.

Sturman et al U.S. Pat. No. 6,257,264 is a programmable electronic valve controller that uses solar power to operate the logic and valve switching mechanics. Though Sturman's invention is programmable, it is not networkable.

Buma et al U.S. Pat. No. 4,826,141 is an electronic controlled air suspension system that uses a series of valves to control a vehicles ride height and level. Buma invention is for a fixed application and is not adaptable to alternate valve types.

Bronacorsi et al U.S. Pat. No. 5,522,431 is a solenoid valve control system that incorporates individual controllers inside one manifold that can be expanded. Though Bronacorsi's invention is modular, it does not provide visual feedback on each individual valve.

The aforementioned prior art of electronic valve controllers do not incorporate a networkable plug with self-contained electronic programmable controller and visual indications of operating status and error states.

The conventional way of electronically controlling one or more mechanical valves is achieved by using a programmable logic controller or a logic controller variant. The logic controller provides electrical current to energize a coil that is built into or attached to the valve.

The energized coil will alter the valve state to allow fluid or gases to pass. Typically one logic controller would control multiple valves and is located at a remote location away from the valves in an environmentally safe compartment. The logic controller would have a separate set of electrical wires branched out to each valve.

Logic controllers are specifically programmed for a particular valve and operation. Typically, the control system for industrial machinery is a closed loop design. A close loop control system is a control system with an active feedback loop. The logic controllers will take analog input data from an electromechanical transducer (i.e. fluid level, position sensor, etc.) and make a logical decision on how to manipulate an output. There are different valves commonly used in industrial machinery. The two most widely used are hydraulic and pneumatic valves. These valves regulate the amount of fluid or gas that is allowed to pass through the system. The fluid or gas that passes through the valves physically moves a mechanical device such as a piston or bladder. This movement translates into mechanical work.

Hydraulic valves operate at a variety of different frequencies and duty cycles. The amount of fluid that is allowed to pass can be incrementally increased from 0 to 100 percent depending on the duty cycle or current supplied. Pneumatic valves typically are either fully opened or fully closed. These valves operate at a variety of voltages. Precise control of the valves is needed to accurately manipulate machinery. Therefore, it is important that the controller have constant, accurate feedback and execute logic commands near real time.

As more systems and machinery are automated, it is required that logic controllers be networked together. Typically this is accomplished by using Ethernet, serial RS232/RS422, Controller Area Network bus or fiber optics communications. The ability to network controllers together provides near real-time data to be transferred to other remote logic controllers. The networked data can be processed by a neighboring controller(s) or monitored remotely by a machine operator. Networking allows system expansion and the ability for the system to provide feedback.

Diagnosing a system that is malfunctioning can be challenging. The time to find and diagnose an issue can be compounded by the complexity of the system. Typically, if there was a problem with a complex system, a subject matter expert of that particular control system would be consulted to diagnose the problem. In other cases, the cause to a malfunctioning system can be very simple. The valves may malfunction when they are overheating or frozen. The connections to the valve from the controller can disconnect causing a system malfunction. In some cases a disconnected valve could cause catastrophic failure or even seriously injury to personnel. The analog input to the controller could also become disconnected and cause invalid logic decisions creating the same malfunction symptoms as a disconnected or stuck valve. Finally, the network or controller could be damaged and prevent the entire system or machinery from operating. A good control system has safety measures in place to perform self-diagnostics and communicate when a malfunction has occurred. These self-diagnostics and safety measures are not typically built into logic controllers and require additional configuration considerations.

In the disclosure that follows, a new design for an electronic valve controller is introduced that provides modularity, automated safety, and visual feedback in a small, lightweight, low cost plug.

BRIEF SUMMARY OF THE INVENTION

The present invention overcomes two problems associated with prior art. More specifically, the present invention is a multifunction networkable controller plug that provides modularity and visual feedback in a single package that no other controller plug presently does.

Due to the physical size and versatility of this present invention, it is completely attuned for support of today's modular equipment designs. The present invention is a fully functional controller that is built into a connector plug. The controller's power output of the present invention can be configured and controlled remotely. Furthermore, the controller's power output can be configured for any connected component that requires pulse width modulation, current control, or voltage input.

No dedicated external controller is needed with this invention. Each plug contains an independent controller creating a very robust control system. The present invention has multiple inputs, outputs, and visual indications. The present invention contains a microcontroller that allows for customization of internal methods and algorithms. The present invention's compact design and networking capability ultimately saves on system real estate and total amount of installation hardware used for a particular system.

Each controller has a built in controller area network bus transceiver that allows the present invention to be placed on a network. Controller area network is a robust protocol used to daisy chain multiple electronic controllers on one bus. The present invention can be easily added to and removed from a controller area network supporting a modular design.

Typical control systems have the ability to communicate to a remote monitoring station or to other networked controllers. There are safety concerns if the controller does not detect an open load or power output from the controller has shorted. These are both potentially very dangerous situations to the operator and the machinery. To increase the operator awareness of the controller status, the present invention has multiple light emitting diodes in various colors to visually indicate and inform the operator of its' status. The plug in the present invention has a translucent window allowing nearby spectators to inspect the light emitting diodes on the controller from a distance. The light emitting diodes indicate the controller's output, power input, network communications, and error states.

For the detection of errors, the present invention has two metal-oxide semiconductor field effect transistors with built-in diagnostics. These devices provide power to energize the connect load and also inform the processor of shorts and open loads. If an error is detected, the colored light emitting diodes will flash in a predetermined sequence visually indicating an error has occurred. The controller will simultaneously broadcast this error on the controller area network bus. Controller plugs on the same controller area network bus can continue operation or go into an emergency stop mode protecting the system from potential damage. The operator will not have to spend valuable time debugging the system to find where the problem is originating; simply find the controller plug indicating an error from the light emitting diodes.

No other valve system has this capability without a central controller and sophisticated feedback components.

DETAILED DESCRIPTION OF THE INVENTION

Figure 1:
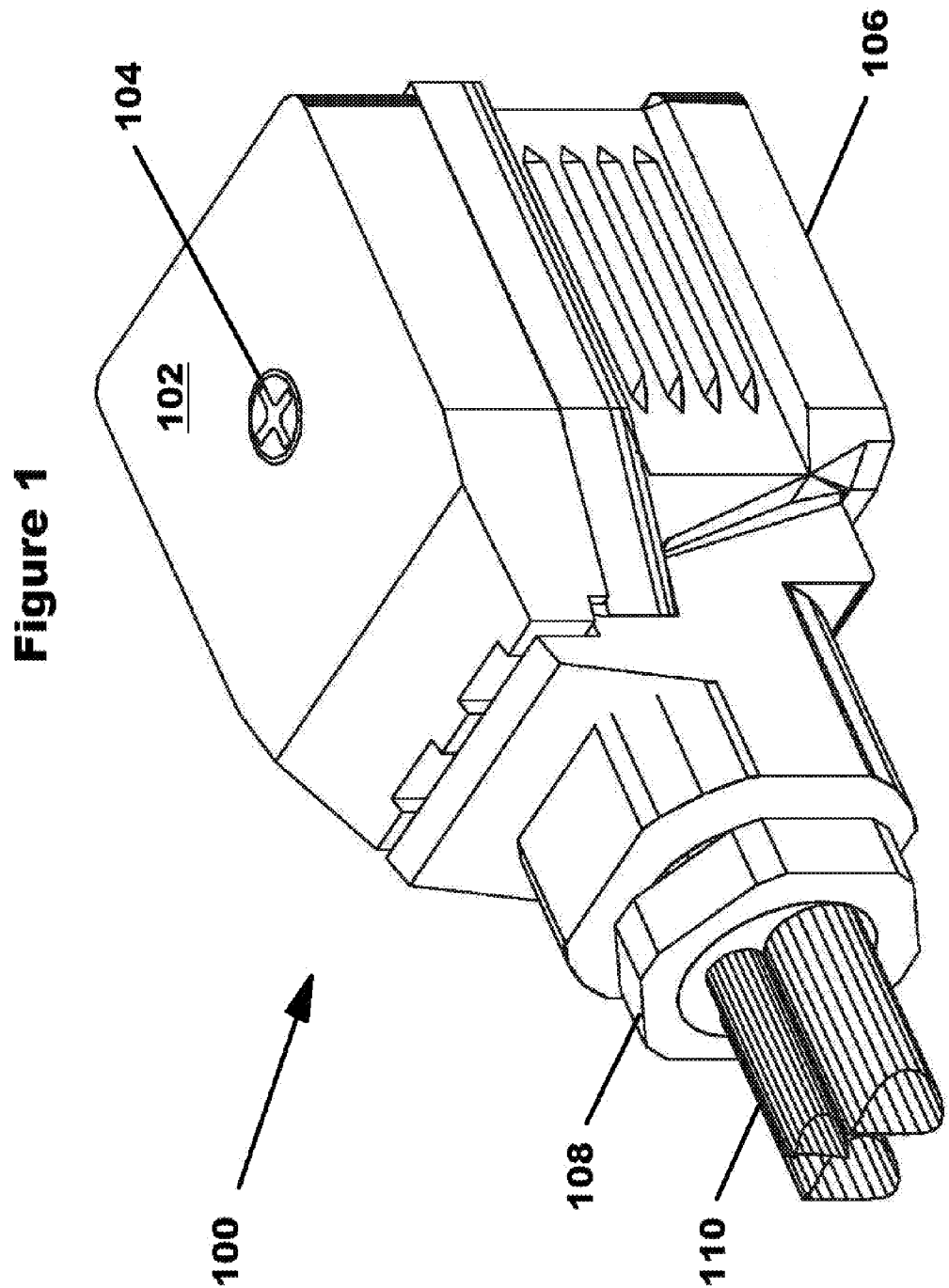
FIG. 1 is a perspective schematic view of one embodiment of the invention.
Figure 2:
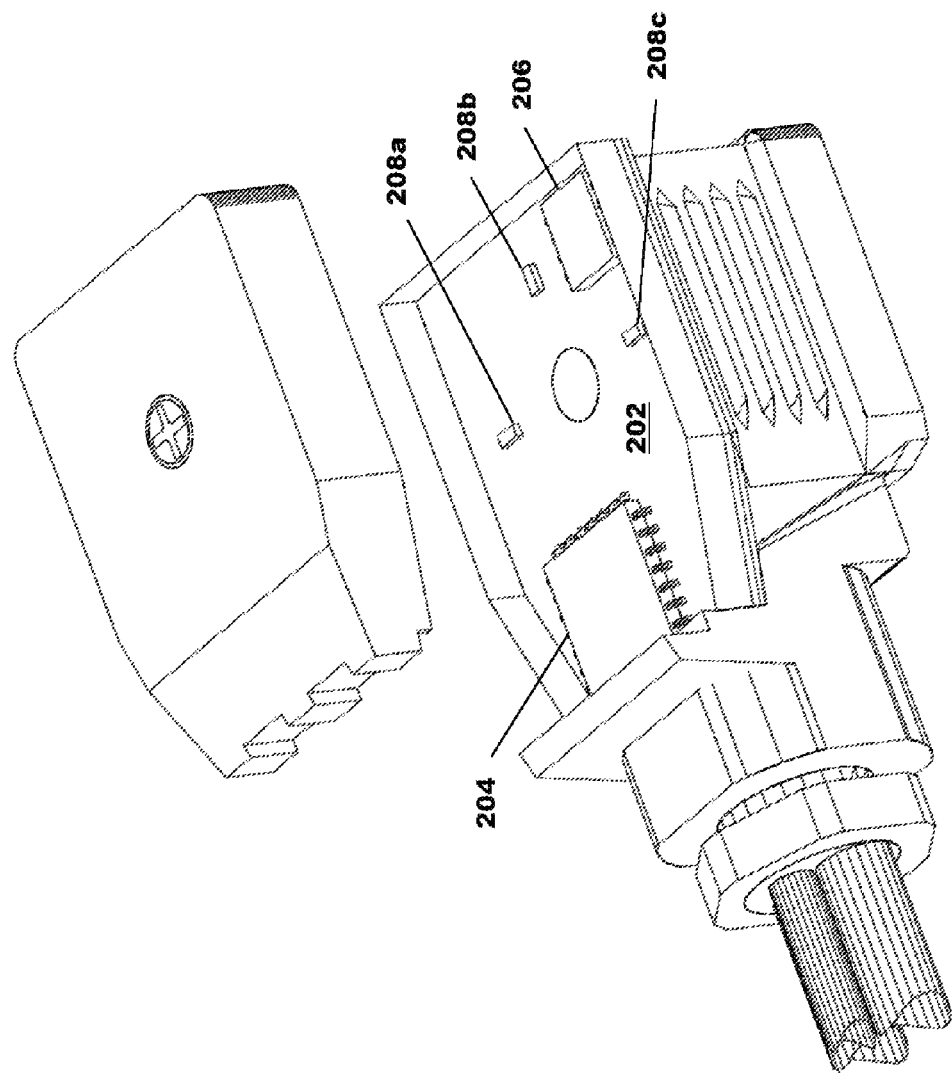
FIG. 2 is an isotropic view of the present invention with the translucent lid removed.

First referring to FIG. 1, the present invention includes an industrial plug 100, printed circuit board 202, and cable leads 110. The industrial plug 100 comprises of connector housing 106, translucent lid 102, cable gland 108, and receptacle 308. The connector housing 106 and translucent lid 102 is made from a polyamide plastic material. The printed circuit board 202 is comprised of a variety of discrete components which make up the multifunction networkable controller. The industrial plug's receptacle 308 is associated with standard Deutsche Industrial Normale 43650 type A, which is comprised of three U-shaped female receptacles located in the three, six, and nine o'clock positions and one blade shaped female receptacle in the 12 o'clock position. The industrial plug's receptacle 308 would connect and attach using a center mounted screw 104 to a device with a mating Deutsche Industrial Normale 43650-A connection. The translucent lid 102 is removable which allows access to the printed circuit board 202 placed inside the industrial plug 100. The translucent lid 102 allows the light emitting diodes 208*a*, 208*b*, 208*c* connected to the printed circuit board 202 to be seen by a nearby observer. The translucent lid 102 contains a gasket 310 that is attached to the underside outer perimeter. This gasket 310 provides protection against foreign matter and moisture when properly attached to the connector housing 106. Two cable leads 110 provide both power and communications. The cables 110 enter the connector housing 106 through an environmentally protected cable gland 108. Rubber seal rings inside the gland 108 provide a barrier from foreign matter and moisture entering the connector housing 106.

Figure 3:
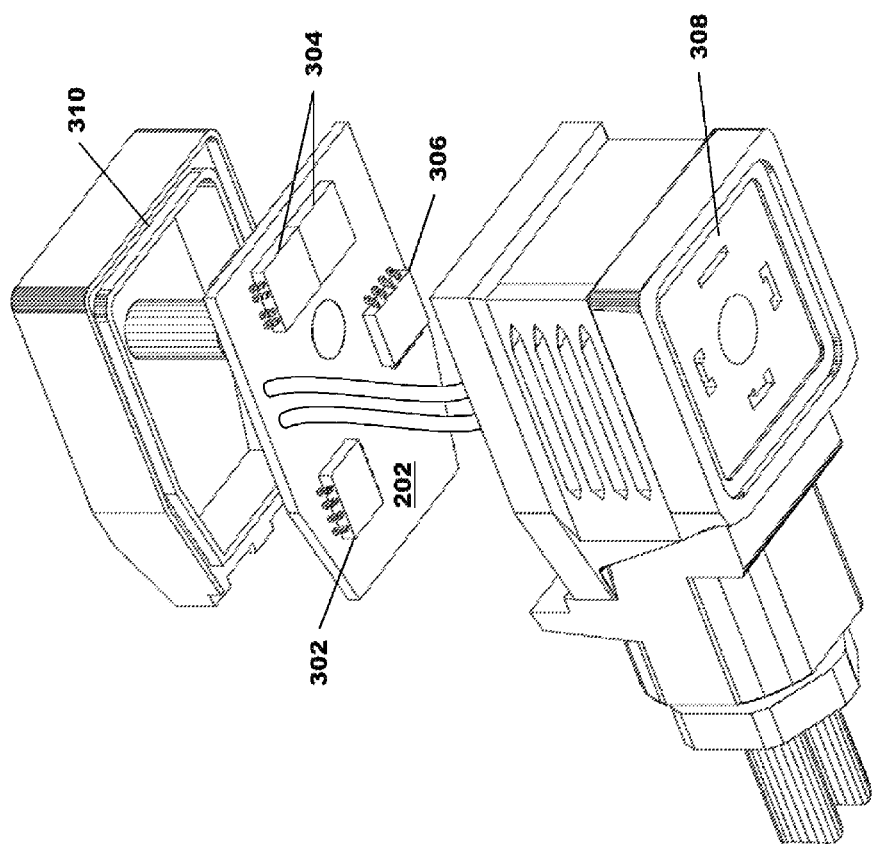
FIG. 3 is a bottom isotropic view with the printed circuit board and translucent lid removed.

The printed circuit board 202 in FIG. 3 is the key component of the present invention and includes the microprocessor 204, Controller Area Network transceiver 302, quartz resonator 408, operational amplifiers 306, smart metal-oxide-semiconductor field-effect transistors 304, step down voltage regulator 206, light emitting diodes 208*a*, 208*b*, 208*c*, temperature sensor 404, and supporting components such as resistors and capacitors. The microprocessor 204 contains all of the clock switching, code logic, algorithms, input/output, and memory storage necessary to operate the controller 202 as described in the present invention. The microprocessor operates from an external quartz resonator 408. The microprocessor 204 operates using instructions preprogrammed into the device. The microprocessor 204 utilizes multiple analog inputs which are used for control loop feedback, determining internal plug temperature, and external sensor voltages 504.

A Controller Area Network transceiver 302 is utilized in the present invention when external communications are desired by the user. The Controller Area Network transceiver 302 is mounted onto the printed circuit board 202 as shown in FIG. 3. It converts a differential voltage present on the communication bus to a transistor-transistor logic level utilized by the microprocessor. The microprocessor 202 is capable of transmitting and receiving data in various formats including Society of Automotive Engineers J1939, National Marine Electronics Association 2000, DeviceNet, or CANopen protocols.

Figure 4:
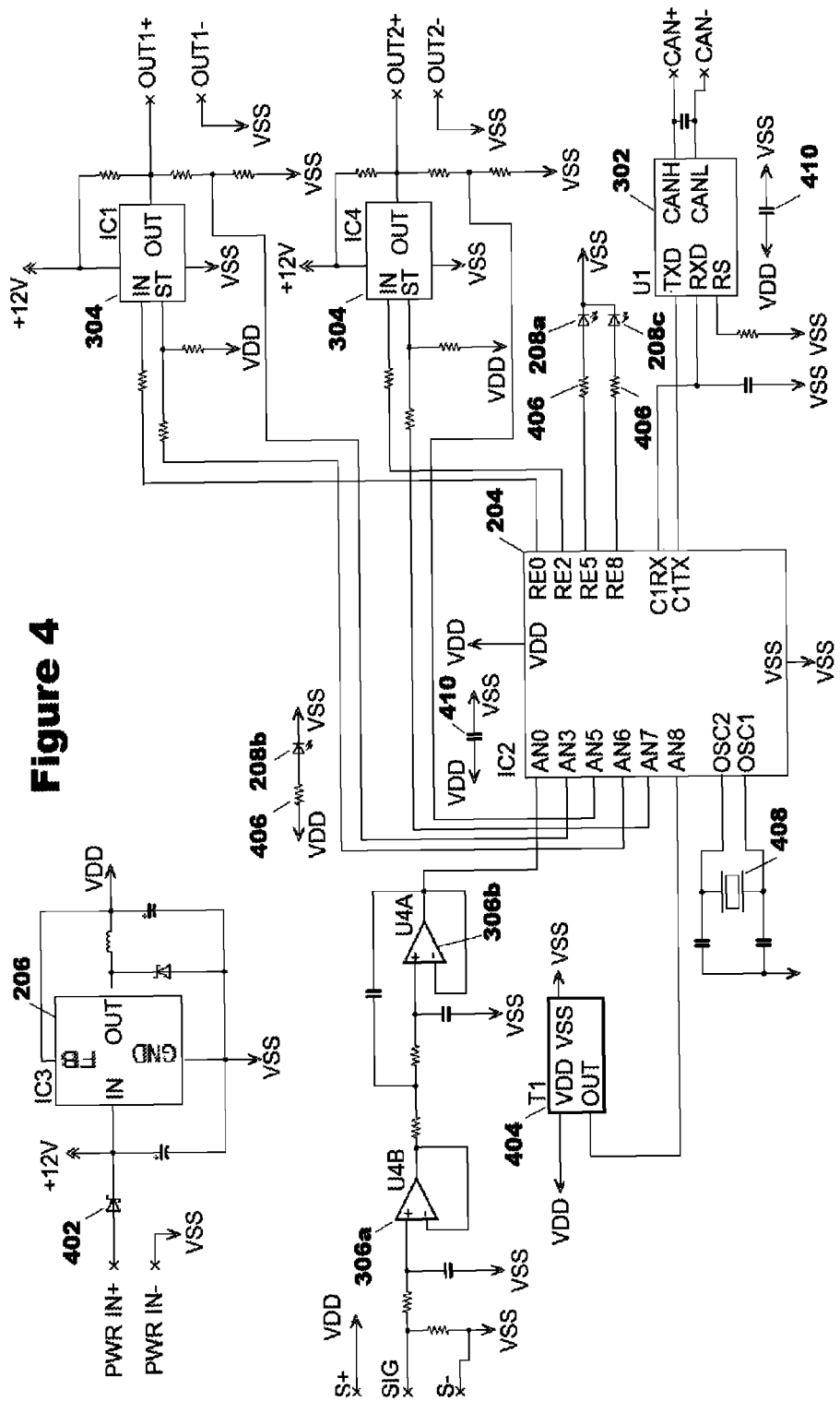
FIG. 4 is a circuit diagram for the exemplary embodiment of the invention in FIG. 1.
Figure 5:
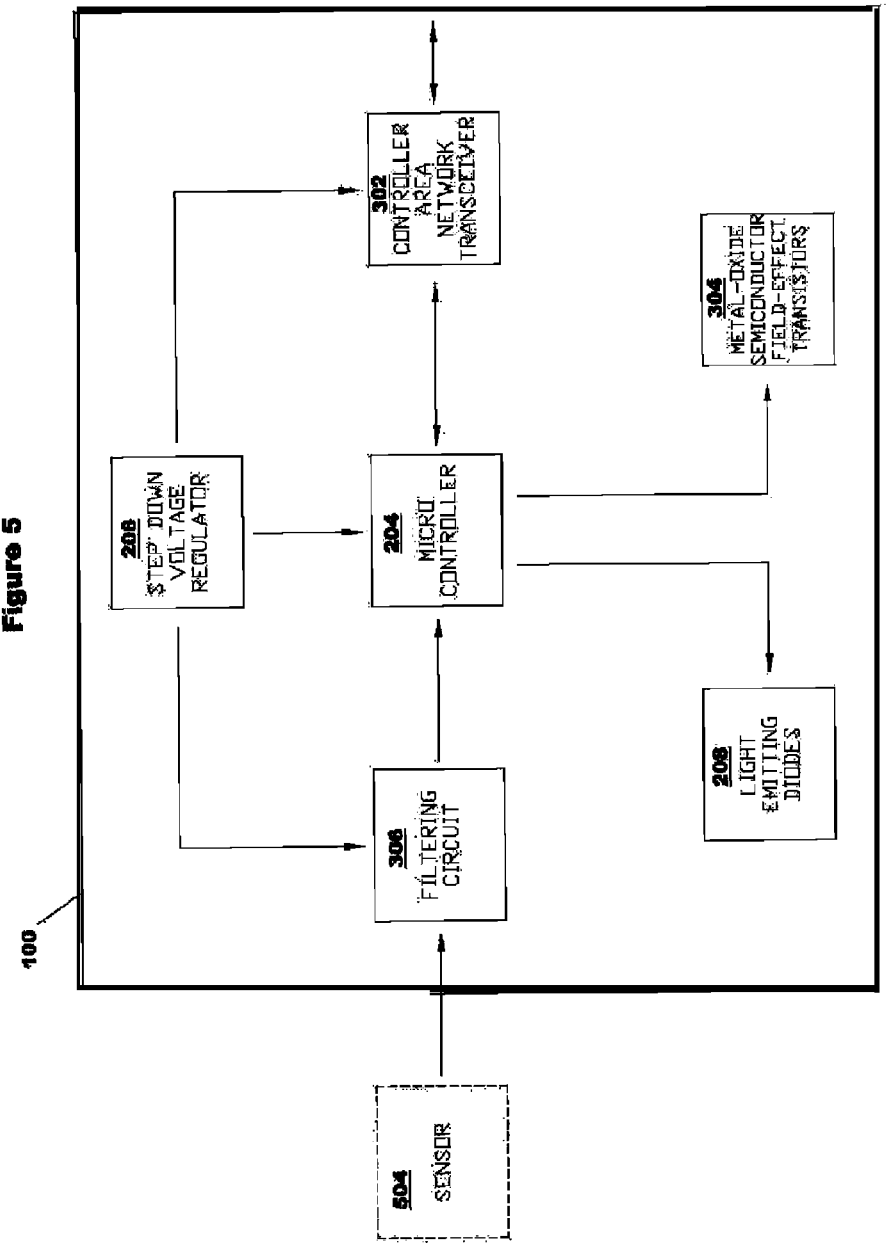
FIG. 5 is a block diagram illustrating one embodiment for implementing the present invention.
Figure 6:
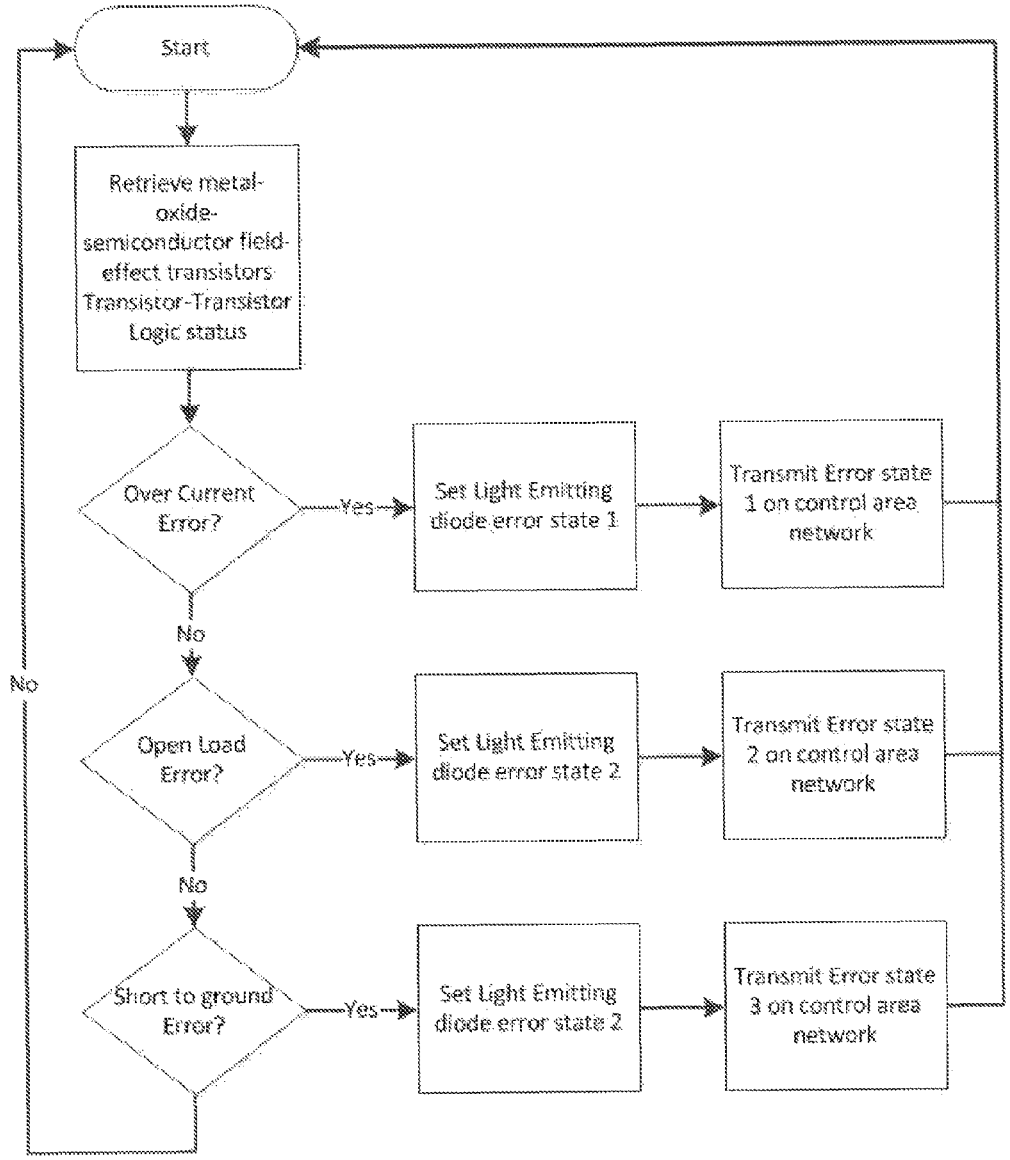
FIG. 6 is a logic flow diagram for the microcontroller error notification software on the present invention controller.

As shown in FIG. 4, the multi-order Butterworth filter utilizes two operational amplifiers 306*a*, 306*b* in providing a hardware filter for one or more analog sensor inputs. The operational amplifiers 306*a*, 306*b* inherently provide a voltage buffer from sensor to microprocessor 204 and prevents unacceptable or undesirable loading on the sensor's output.

One or more smart metal-oxide-semiconductor field-effect transistors 304 are used for controlling external electrical loads. The metal-oxide-semiconductor field-effect transistors 304 have built-in internal failsafe's to protect themselves from over-current and over-heating conditions. The metal-oxide-semiconductor field-effect transistors 304 also detect and report open load or short to ground conditions. Each of the metal-oxide-semiconductor field-effect transistors 304 in the system has a Transistor-Transistor Logic status line that provides information to the microprocessor 204 of a failsafe condition. The Transistor-Transistor Logic status line is continuously being monitored by the microprocessor 204. During a failure condition, the microprocessor 204 will either turn off the metal-oxide-semiconductor field-effect transistors 304 output and/or broadcast a failed condition using Controller Area Network communications and light emitting diodes 208.

The present invention is capable of being powered by a wide range of direct current voltages for powering the printed circuit board circuitry and external loads. The step down voltage regulator 206, also referred to as a buck converter, takes in a wide range of direct current voltages and regulates it to one voltage level. The diode 402 will prevent electrical current from flowing in the opposite direction. The diode is used primarily to protect the printed circuit board 202 design from being damaged from reverse polarity.

The resistor 406 is designed to regulate the current through the light emitting diodes 208a, 208b, 208c. The light emitting diodes 208a, 208b, 208c are used to visual indicate operating status and error states of the controller.

The invention claimed is:

1. A self-contained programmable controller connector comprising:
   a connector housing containing an electronic circuit board;
   a housing lid attached to the connector housing for protection of the electronic circuit board;
   a wire grommet attached to the housing lid for preventing foreign matter from entering the connector housing;
   a four pin plug, attached to the connector housing for direct electrical attachment to a mating coil of a valve;
   a microcontroller electrically coupled to the electronic circuit board for controlling electrical inputs and outputs with software;
   a communications transceiver electrically coupled to the microcontroller for remote serial communication;
   a transistor electrically coupled to the microcontroller for control of voltage and current to the four pin plug;
   light emitting diodes electrically coupled to the microcontroller for visual status indications;
   a voltage regulator connected to the electronic circuit board for providing regulated voltage to the microcontroller.

2. The self-contained programmable controller connector set forth in claim 1 wherein the microcontroller uses the transistor to transmit a pulse width modulation signal via the four pin plug to the mating electrical coil, thereby controlling direct current thereto.

3. The self-contained programmable controller connector set forth in claim 1 wherein the electronic circuit board, connector housing, and housing lid are all securely attached to the mating coil using one centered mounted screw, thus preventing power from being applied to the mating coil by any means other than serial communication.

* * * * *